(12) United States Patent
Hudson et al.

(10) Patent No.: US 7,554,458 B2
(45) Date of Patent: Jun. 30, 2009

(54) DOWNHOLE COMMUNICATION

(75) Inventors: Steven Martin Hudson, Dorset (GB); John Charles Guess, Dorset (GB)

(73) Assignee: Expro North Sea Limited, Berkshire (GB)

( * ) Notice: Subject to any disclaimer, the term of this patent is extended or adjusted under 35 U.S.C. 154(b) by 188 days.

(21) Appl. No.: 11/281,788

(22) Filed: Nov. 17, 2005

(65) Prior Publication Data

US 2007/0120704 A1    May 31, 2007

(51) Int. Cl.
 *G01V 3/00* (2006.01)
(52) U.S. Cl. .............. 340/854.9; 340/854.4; 340/855.8; 166/250.15; 166/242.1; 166/242.6
(58) Field of Classification Search .............. 340/855.1, 340/853.1, 854.4, 854.9, 855.8; 166/242.1–242.9, 166/250.15
See application file for complete search history.

(56) References Cited

U.S. PATENT DOCUMENTS

| | | | |
|---|---|---|---|
| 4,181,014 A | | 1/1980 | Zuvela et al. |
| 4,649,993 A | | 3/1987 | Going, III |
| 5,217,071 A | * | 6/1993 | Ferry et al. ............... 166/242.3 |
| 5,394,141 A | | 2/1995 | Soulier |
| 5,576,703 A | | 11/1996 | MacLeod et al. |
| 5,691,712 A | * | 11/1997 | Meek et al. ............... 340/853.3 |
| 5,745,047 A | * | 4/1998 | Van Gisbergen et al. . 340/853.1 |
| 5,959,547 A | * | 9/1999 | Tubel et al. ............... 340/853.2 |
| 6,252,518 B1 | * | 6/2001 | Laborde ................... 340/855.4 |
| 6,374,913 B1 | * | 4/2002 | Robbins et al. ................ 166/66 |
| 6,640,900 B2 | * | 11/2003 | Smith .......................... 166/336 |
| 6,899,178 B2 | | 5/2005 | Tubel |

FOREIGN PATENT DOCUMENTS

| | | |
|---|---|---|
| GB | 2 338 253 | 12/1999 |
| GB | 2 366 817 | 3/2002 |
| GB | 2 401 617 | 11/2004 |
| WO | WO 99/37044 | 7/1999 |
| WO | WO 01/04461 | 1/2001 |

\* cited by examiner

*Primary Examiner*—Timothy Edwards, Jr.
(74) *Attorney, Agent, or Firm*—Alston & Bird LLP

(57) ABSTRACT

Methods of and apparatus for a downhole communication in a well. The well has a metallic structure which includes an insulated metallic, fluid carrying, control line. The method comprises the steps of applying signals to the control line at a first location and extracting the signals from the control line at a second location.

There is also provided a downhole communication system for use in a well having a metallic structure. The metallic structure includes an insulated metallic, fluid carrying, control line. The system comprises means for applying signals to the control line at a first location and means for extracting the signals from the control line at a second location. The control line acts as a signal channel.

Other methods and apparatus making use of control line carrying no fluid and/or the metallic shielding of cable having insulated metallic shield are also described.

38 Claims, 5 Drawing Sheets

DOWNHOLE COMMUNICATION

This application relates to downhole communication, particularly communication in a well having a metallic structure which includes an insulated metallic fluid carrying control line and/or an electrical cable with an insulated outer metallic shielding which provides a pressure seal for the cable.

There are currently quite a number of signal transmission techniques used in the downhole environment which make use of the metallic structure of a well as the signal channel. In general terms, these existing techniques make use of production tubing or casing as the signal channel.

Two areas which give particular difficulties in operating such systems are, operating in cased sections of the well and extracting signals out from the top of the well.

In a large number of wells, a subsurface safety valve will be provided, typically a few hundreds of metres below the surface. The function of subsurface safety valves is well understood and in general terms they are provided to enable emergency shut off of the well. Typically subsurface safety valves are hydraulically operated and this means that there is typically a fluid control line or conduit provided from the surface down to the subsurface safety valve. This control line is often insulated and typically runs within the annulus defined between the production tubing and the well casing. It is perhaps feasible that the control circuit would be gas operated rather than hydraulically operated. In such cases a fluid control line would still be provided but clearly then would carry gas rather than liquid.

It has been realised by the applicants that the existence of such a control line in the well can be of use in signal transmission within the well.

It has also been realised that in some situations it may be desirable to introduce control line into a well specifically to provide a signal channel. Further in other situations it can be desirable to use the outer metallic shielding of an electrical cable having an insulated outer metallic shielding, as a signal channel. Such an electrical cable may, for example, be in situ having the primary purpose of allowing extraction of data from a permanent downhole gauge (PDG). In such a case the inner conductor of the cable will be used by the PDG and the outer shielding is there to protect the cable and provide pressure retention.

According to one aspect of the present invention there is provided a method of downhole communication in a well having metallic structure which includes an insulated metallic, fluid carrying, control line, the method comprising the steps of applying signals to the control line at a first location and extracting the signals from the control line at a second location.

According to another aspect of the present invention there is provided a downhole communication system for use in a well having metallic structure which includes an insulated metallic, fluid carrying, control line wherein the system comprises means for applying signals to the control line at a first location and means for extracting the signals from the control line at a second location and the control line acts as a signal channel.

Typically, a respective portion towards each end of the control line will be electrically and mechanically connected to other portions of metallic structure in the well so that a conducting loop exists of which the control line is a part. In other cases however, one end of the control line may be electrically isolated from the surrounding structure, in particular isolation may be provided which allows the control line to pass through the well head without electrical contact being made to the well head.

Trying to extract (or apply) signals directly from (to) the control line after it has passed through the well head is attractive but poses significant difficulties. It is difficult to successfully insulate the control line from the well head and provide the necessary pressure seal. It has been realised however, that it is not necessary to extract (or apply) signals from (to) the control line in such a way and this has allowed the development of more easily implemented techniques.

The signals may be applied to and extracted from the control line either directly or indirectly. By this it is meant that in some cases there may be coupling means provided at the control line for applying and/or extracting signals but in other cases the signals may be conducted along the metallic structure and into the control line and/or conducted from the control line into other portions of metallic structure.

The signal may be extracted directly from the control line via a respective inductive coupling. The signal may be extracted directly from the control line by detecting the signal across an isolation joint introduced into the control line. Here an isolation joint serves to electrically isolate one portion of the control line from the portion on the other side of the joint whilst still enabling the control line to perform its primary function. The signal may be extracted from the control line using a voltage divider technique. In such a technique the potential difference across a conductor connected in series with a main part of the control line passing towards the transmitting location, is detected. The conductor connected in series may comprise a portion of the control line itself, an additional piece of control line provided in the well for this purpose or another component. In a preferred way of implementing this technique additional control line is wound around the production tubing within the casing with one end of this additional line connected to the well head in the usual way and the other end connected to the control line extending down into the well. Electrical sensing connections can then be made to the additional portion of line towards each end.

The signal may be applied to the control line via a respective inductive coupling or one of the other configurations mentioned above, however, in currently preferred systems the signal is conducted into the control line from other portions of metallic structure.

The method may be a multidrop signalling method where signals may be applied to and/or extracted from the control line at a plurality of spaced locations. This is particularly appropriate where signals are applied to the control line and extracted from the control line via respective inductive couplings. It will be seen that duplex communication is possible.

The or each inductive coupling may comprise a generally toroidal magnetic material core carrying a winding and surrounding the control line so that in use the winding, core and control line together act as a transformer with the control line acting as a single turn winding.

In this application the expression generally toroidal is used to mean a generally ring-like structure which can be used to surround the control line, there is no suggestion that the ring itself need be of circular shape and nor is there any suggestion that the cross-section of the material making up the ring need be circular.

In a currently preferred set of embodiments the insulated control line is electrically connected, towards its lower end, to tubing in the well so that signals flowing in the tubing can flow into the control line. Further, in these embodiments, means for extracting signals from the control line are disposed towards an upper end of the control line. This arrangement of course also allows signals injected into the control line to flow out into the metallic structure downhole.

In a situation where there is a second well in the same region as the well in which signals are being transmitted, the method may comprise the step detecting signals due to noise seen in the second well and subtracting these from the signal extracted from the control line in the well in which signals are being transmitted.

In some embodiments, signals may be extracted from the control line by the steps of detecting the signals flowing in the control line at two spaced locations, subtracting the signals seen at a first of the locations from the signals seen at the other location and using the result of this subtraction as the output signal.

Typically the hydraulic control line will be provided in the well to supply hydraulic fluid to operate one or more subsurface safety valve. The purpose and function of subsurface safety valves is well understood and is not important to the working of the present invention. In the present system and method, use can be made of the fact that an insulated metallic hydraulic control line will often be found in the well between the wellhead and a subsurface safety valve.

The signals will typically be extracted from the control line at a region towards the location where the control line meets the wellhead. Conventional electrical cabling may be provided for carrying the extracted signals from the interior to the exterior of the well. The cabling may pass through the wellhead via a penetrator arranged to provide a pressure tight seal. It is significantly more straightforward to provide a pressure tight seal allowing cables to exit the well than it is to achieve the same in respect of a fluid carrying control line leaving the well.

An amplifier, for amplifying the extracted signals, may be provided locally at a point where the signals are extracted from the control line. This can allow the signals to be amplified in a relatively low noise environment before being fed to the exterior, for example, through the wellhead.

A coupling for extracting signals from the control line may comprise a current pick up coil which is arranged to be slipped over a free end of the control line. In installing such a pick up coil, the control line may be disconnected from the wellhead to allow the pick up coil to be passed over the now free end of the control line, after which the control line may be reconnected. A similar process may be used in inserting an isolation joint into the control line or in introducing an additional length of control line for use in a voltage divider.

Although not always specifically mentioned above, it will be appreciated that the communication system may comprise apparatus arranged for carrying out any one or any combination of the steps defined above. Similarly, whilst the above is mainly written in terms of signals travelling up the well and being extracted at the well head, the same or similar apparatus and the same or similar techniques may be used in transmission downwards, applying signals to the control line at the well head. Thus, for example, additional lengths of line, isolation joints and inductive coupling coils may be used to inject signals into the control line at the well head.

At least some of the features defined above are compatible with the further aspects of the invention defined below and should be considered as possible subsidiary features of the aspects of the invention defined below where context allows.

According to another aspect of the present invention there is provided a well installation comprising a data receiving system for receiving data from a downhole location, the well installation comprising main metallic downhole structure including at least one of metallic tubing and metallic casing and also comprising a signal channel including at least one of metal of an insulated metallic control line and metal of an outer metallic shielding of an electrical cable with an insulated outer metallic shielding, wherein the data receiving system comprises a receiver connected to the signal channel, and the signal channel is connected to the main metallic downhole structure at a plurality of spaced locations via respective impedance elements.

Such an arrangement can facilitate pick up, by the signal channel and hence receiver, of electrical signals carried by the main metallic downhole structure. The well installation may further comprise a downhole data transmitting tool for applying data carrying electrical signals onto the main metallic downhole structure.

The data transmitting tool may be arranged for location within/disposed within the main metallic downhole structure. The data transmitting tool may be arranged as part of a mandrel arrangement. The data transmitting tool may be mounted externally to casing where present. The data transmitting tool may be completion conveyed, typically as part of a mandrel arrangement. The data transmitting tool may be retrofitted in tubing, for example via wire line.

The data transmitting tool may comprise a gauge for measuring a parameter such as temperature or pressure.

The current well installation arrangement is particularly useful where the location from which the transmitting tool is to transmit is variable over time and/or unknown at the time of making the well installation. This is because each location at which there is a connection between the main metallic downhole structure and the signal channel acts as a pick up location for signals. Once the signals are in the metal of the control line or cable shield they propagate with lower attenuation and pick up less noise.

Preferably each impedance element comprises a resistor having a first terminal which is connected to the main metallic downhole structure and a second terminal which is connected to the signal channel.

The resistance values of each of the resistors may be substantially the same as one another. The resistance value of each resistor may be chosen to be significantly greater than the resistance of the signal channel between an adjacent pair of the spaced connection locations.

The resistance values of the resistors may be chosen so as to be different from one another with the values being chosen so that they are progressively lower in value the further into the well installation that the respective resistor is located. In such a case the values may be chosen such that the pick up sensitivity at each connection location is substantially the same.

Preferably there are three or more spaced locations at which there is a connection between the main metallic downhole structure and the signal channel. The spaced locations may be arranged such that there is an equal spacing between each adjacent pair of locations. The spacing between adjacent pairs of locations may be in the order of 1000 feet (300 m).

The control line or electrical cable may be provided in the well for another primary purpose and use of it made in the present techniques. Alternatively the control line or electrical cable may be provided specifically for use in the present techniques.

The control line may be a fluid carrying control line connected to a downhole device operable under action of fluid in the control line. The electrical cable may comprise an inner core which is electrically connected to a downhole gauge.

The well installation will typically be arranged such that where the control line or electrical cable is provided for a primary purpose this primary purpose is unaffected or at least compatible with using the signal channel for signalling as defined above. Thus for example control line may be provided so that one or more valve can be hydraulically controlled and the metallic part of the control line used to electrically signal, thus providing two functions on a common, in this case single, line.

A downhole end of the metal of the control line or metallic shielding of the electrical cable will often be mechanically and electrically connected to the main metallic downhole structure. The electrical connection may be direct or via an impedance element.

In alternatives a downhole end of the metal of the control line or metallic shielding of the electrical cable can be electrically isolated from the main metallic downhole structure.

The control line or electrical cable may be provided in any practical location within the well installation, for example, in the annulus between the tubing and the casing, externally to the casing, or externally to the tubing of an uncased installation.

The signal channel may be electrically isolated from a head of the well. Where control line is used the well installation may comprise an isolation joint for electrically isolating the control line from the wellhead.

The isolation joint may be for coupling the insulated metallic control line to a portion of electrical cable which has an inner conductor and an insulated outer metallic shielding, the isolation joint comprising a first conducting portion for receiving and electrically connecting to metal of the portion of insulated metallic control line, a second conducting portion for receiving the portion of electrical cable, and between the first and second conducting portions an electrically isolating portion that electrically isolates the first and second portions from one another, the isolation joint further comprising a conductor which is insulated from the second conducting portion, bridges the isolating portion, and electrically connects the inner conductor of the portion of electrical cable to the first conducting portion.

If such an isolation joint is used when joining a portion of insulated metallic control line to a portion of electrical cable which has an inner conductor and an insulated outer metallic shielding there is electrical isolation between the control line and the shielding of the cable. This means that although as the cable passes through the well head there will be electrical connection between the shielding and the well head, there is not electrical connection between the metal of the control line and the well head. Rather the signal on the control line can pass through the well head on the inner conductor of the cable.

In a simple form such an isolation joint can be where the control line is provided primarily for signalling purposes and there is no need to carry hydraulic fluid beyond the isolation joint.

In a development the isolation joint may also be arranged for receiving a second portion of insulated metallic control line. The second conducting portion may be arranged to receive a second portion of insulated metallic control line. A third conducting portion may be provided which is insulated from the first conducting portion and is arranged to receive a second portion of insulated metallic control line. Such an arrangement can allow a flow of hydraulic fluid through the isolation joint from the first to the second portions of control line.

According to another aspect of the present invention there is provided a method of data communication in a well installation, the installation comprising a surface communication unit and at least one downhole communication unit arranged for communication with the surface unit, the well installation further comprising main metallic downhole structure including at least one of metallic tubing and metallic casing and also comprising a signal channel including at least one of metal of an insulated metallic control line and metal of an outer metallic shielding of an electrical cable with an insulated outer metallic shielding, the surface communication unit being connected to the signal channel, and the signal channel being connected to the main metallic downhole structure at a plurality of spaced locations via respective impedance elements, and the method comprising the steps of:

at least one of applying downhole to surface data carrying electrical signals to the main metallic downhole structure at the at least one downhole communication unit and applying surface to downhole data carrying electrical signals to the signal channel at the surface communication unit; and respectively at least one of receiving the downhole to surface data carrying electrical signals from the signal channel at the surface communication unit, and receiving the surface to downhole data carrying electrical signals from the main metallic downhole structure at the at least one downhole communication unit.

According to another aspect of the present invention there is provided a well installation comprising a data transmitting system for transmitting data to a downhole location, the well installation comprising main metallic downhole structure including at least one of metallic tubing and metallic casing and also comprising a signal channel including at least one of metal of an insulated metallic control line and metal of an outer metallic shielding of an electrical cable with an insulated outer metallic shielding, wherein the data transmitting system comprises a transmitter connected to the signal channel, and the signal channel is connected to the main metallic downhole structure at a plurality of spaced locations via respective impedance elements.

The well installation may further comprise a downhole data receiving tool for receiving data carrying electrical signals from the main metallic downhole structure.

According to another aspect of the present invention there is provided a well installation comprising main metallic downhole structure including at least one of metallic tubing and metallic casing, a signal channel including at least one of metal of an insulated metallic control line and metal of an outer metallic shielding of an electrical cable with an insulated outer metallic shielding, a surface communication unit for at least one of receiving data from and transmitting data to a downhole location via electrical signals along the signal channel, and a plurality of downhole units for at least one of receiving data from and transmitting data to the surface communication unit, the downhole units being spaced from one another and each downhole unit having a first terminal electrically connected to the main metallic downhole structure at a respective location and a second terminal electrically connected to the signal channel at a respective location.

The signal channel may be disposed outside of the casing and each downhole unit may be disposed outside of the casing.

Preferably a downhole end of the metal of the control line or metallic shielding of the electrical cable is electrically isolated from the main metallic downhole structure.

The use of control line is preferred where this is run within the installation specifically for use in the present techniques.

Where the downhole end of the control line is electrically isolated from the main metallic downhole structure, the downhole end may be terminated using a pressure proof terminator that seals the end of the control line.

The signal channel may be electrically isolated from a head of the well. Where control line is used the well installation may comprise an isolation joint for electrically isolating the control line from the wellhead.

According to another aspect of the present invention there is provided a downhole isolation joint for coupling a portion of insulated metallic control line to a portion of electrical cable which has an inner conductor and an insulated outer metallic shielding, the isolation joint comprising a first conducting portion for receiving and electrically connecting to metal of the portion of insulated metallic control line, a second conducting portion for receiving the portion of electrical cable, and between the first and second conducting portions an electrically isolating portion that electrically isolates the first and second portions from one another, the isolation joint further comprising a conductor which is insulated from the second conducting portion, bridges the isolating portion, and electrically connects the inner conductor of the portion of electrical cable to the first conducting portion.

If such an isolation joint is used when joining a portion of insulated metallic control line to a portion of electrical cable which has an inner conductor and an insulated outer metallic shielding there is electrical isolation between the control line and the shielding of the cable. This means that although as the cable passes through the well head there will be electrical connection between the shielding and the well head, there is not electrical connection between the metal of the control line and the well head. Rather the signal on the control line can pass through the well head on the inner conductor of the cable.

In a simple form such an isolation joint can be used where the control line is used provided primarily for signalling purposes and there is no need to carry hydraulic fluid beyond the isolation joint.

In a development the isolation joint may also be arranged for receiving a second portion of insulated metallic control line. The second conducting portion may be arranged to receive a second portion of insulated metallic control line. A third conducting portion may be provided which is insulated from the first conducting portion and is arranged to receive a second portion of insulated metallic control line. Such an arrangement can allow a flow of hydraulic fluid through the isolation joint from the first to the second portions of control line.

Embodiments of the present invention will now be described by way of example only with reference to the accompanying drawings in which:

FIG. 1 schematically shows a well including a downhole communication system embodying the invention and which can be operated using a method which embodies the present invention;

Figure 1:
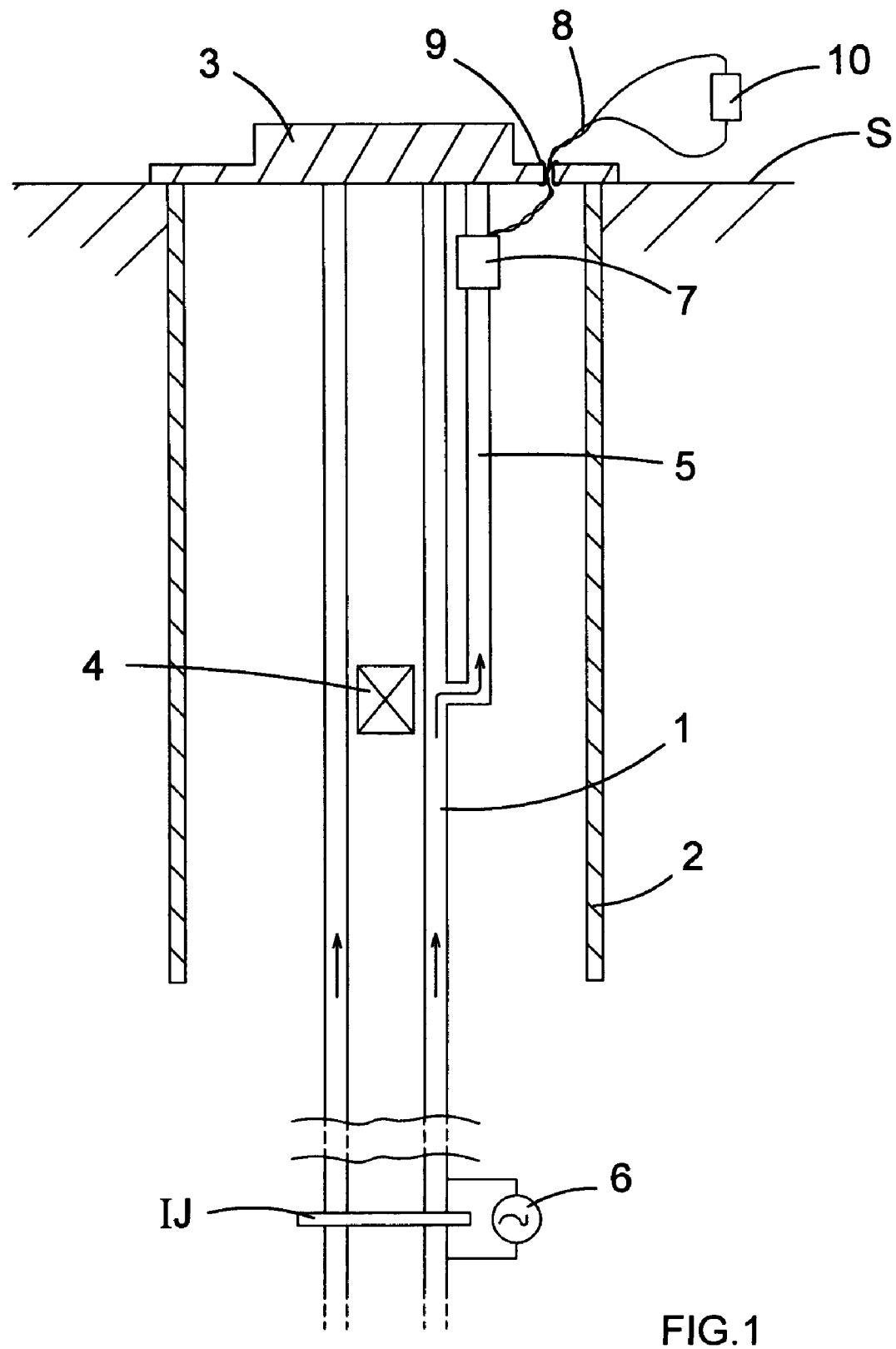

FIG. 1 shows a well generally comprising production tubing 1 encased to a predetermined depth by casing 2. The production tubing 1 and casing 2 are joined to a well head 3 at the surface or sea bed S. A subsurface safety valve 4 is provided within the production tubing 1 which can be used in a conventional manner to provide an emergency shut off of the production tubing if this is required. The subsurface safety valve 4 is hydraulically operated and a hydraulic control line 5 is provided for supplying hydraulic fluid from the surface S to the subsurface safety valve 4. The hydraulic control line 5 runs within the casing 2 and is also provided with its own electrically insulating sheathing. On the other hand however, the hydraulic control line 5 is mechanically and electrically connected to the production tubing 1 at one end and to the well head 3 at the other end.

In this embodiment, at a position remote from the hydraulic control line 5, an isolation joint IJ is included in the production tubing 1. Transmitting means 6 is connected across the isolation joint IJ and arranged for applying signals to the production tubing 1. These signals can flow up the production tubing and any other metallic structure which is in electrical contact with the production tubing 1. As a consequence when a signal reaches the point in the production tubing 1 to which the hydraulic control line 5 is attached, part of the signal will flow into and along the hydraulic control line 5 as indicated by the arrows.

A pickup module 7 is provided at a location towards the upper end of the hydraulic control line 5, i.e. close to where the control line 5 meets the well head 3. The pickup module 7 primarily comprises a current pickup coil but in some instances may also comprise other electronic equipment such as an amplifier. Cabling 8 runs from an output of the pickup module 7 through a pressure tight penetrator 9 provided in the well head 3 and is connected to a detector 10.

In operation, as described above, signals from the transmitting means 6 travel up the production tubing 1 and hence along the hydraulic control line 5. When the signals pass through the control line 5 in the region of the pickup module 7, corresponding signals are excited in the current pickup coil which are then transmitted along the cabling 8 and can be detected by the detector 10. In this way it is possible to communicate between the transmission means 6 located downhole and the detector 10 located at the surface. Of course, there is little limit to the length of the cabling 8 as it leads away from the well head 3, so the detector 10 can be positioned at any desirable location.

The pickup coil of the pickup module 7 may comprise a generally toroidal magnetic material core which surrounds the hydraulic control line 5 and an appropriate winding which is wound around this core. The ends of the winding in such a case will be connected to the cabling 8.

The pickup module 7 can be made within a relatively small size which is suitable for mounting on the hydraulic control line 5 in the space available within a well. The applicants have found that a pickup coil having a diameter of approximately 2.5 cm and an axial length of 7.5 cm has proved satisfactory. The module 7 can be simply mounted on the control line 5 by the process of disconnecting the hydraulic control line 5 from its connector at the well head 3, slipping the pickup coil of the module 7 over the control line 5 and then reconnecting the control line 5 to the well head 3.

As mentioned above, the hydraulic control line is provided with its own electrically insulating sheathing which is typically plastic. It is normally possible to place the pickup coil directly over the hydraulic control line 5 without any need to alter the sheathing at that point.

It has been determined that, in a typical well, the impedance of the production tubing seen by signals as they reach the point where the hydraulic control line 5 branches off is of the order of 10 milli Ohms, whereas the impedance seen in the control line 5 is of the order of 50 Ohms. Therefore a relatively small proportion of the signal flows up the control line 5. On the other hand, however, once the signal is in the insulated control line 5 there is little further degradation of the signal before it reaches the pickup coil. Moreover, as the signal is split at the point where the control line 5 meets the production tubing 1, the noise in the signal is also split by the same ratio. Therefore, since the signal to noise ratio is the major factor in determining the ability to detect a signal, the smaller overall signal valve, is of little concern. Further, it will be appreciated that, in the case of the signals flowing in the insulated hydraulic control line 5, the casing 2 provides a shielding against further noise being introduced.

Figure 2:
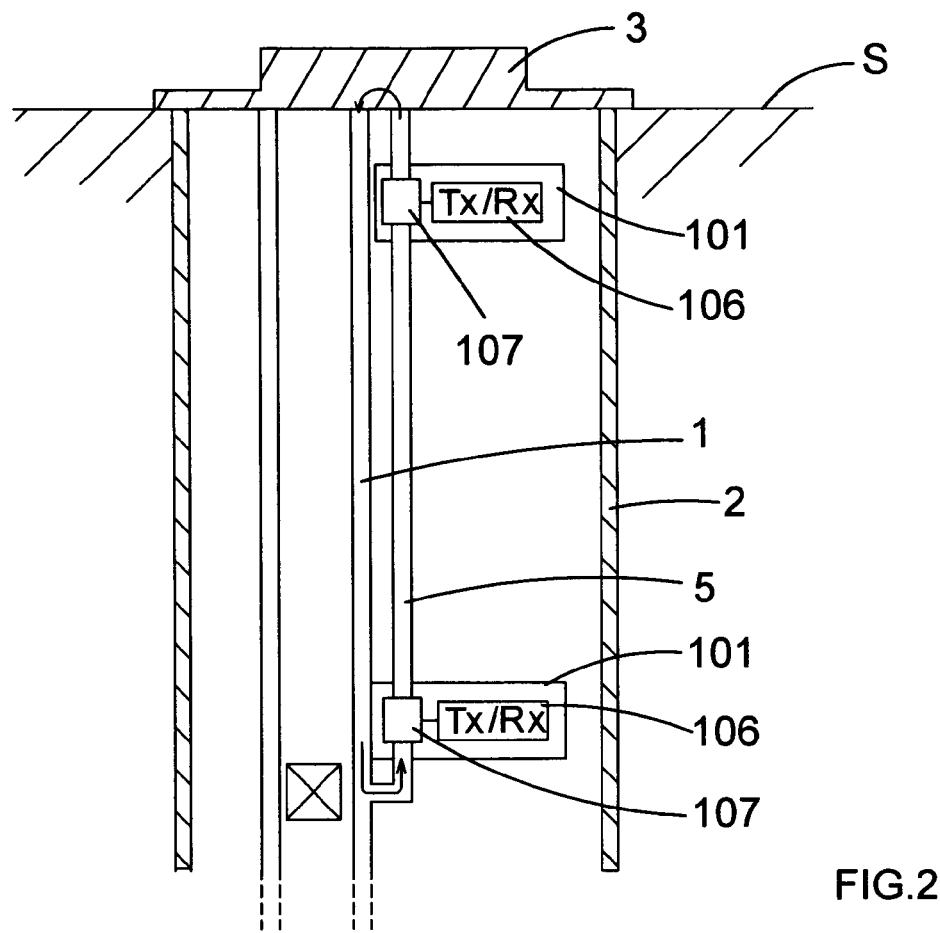
FIG. 2 shows another well including a different downhole communication system which uses similar principles to that of the embodiment shown in FIG. 1.

FIG. 2 shows another well including a downhole communication system embodying the present invention. In this case the structure of the well is substantially the same as that described above and the same reference numerals have been used to indicate the corresponding features. Detailed description of the well structure is omitted for the sake of brevity.

In this case, again the insulated hydraulic control line 5 is used for signal transmission within the well. In this case, use is made of the fact that a current loop path is created by the metallic structure of the tubing 1, the control line 5 and the well head 3. The loop around which current may flow is indicated by the arrows in FIG. 2. In this embodiment respective transceiver modules 101 are provided at opposite ends of the hydraulic control line 5. Each transceiver module 101 comprises an inductive coupling means 107 which surrounds the hydraulic control line 5 at an appropriate location and which is connected to a respective transmitter receiver unit 106.

In this embodiment the transceiver modules 101 can communicate with one another along the hydraulic control line 5. That is to say signals can be transmitted from the lower end of the control line 5 towards the surface S and vice versa.

It will be realised that in practice more transceiver modules 101 could be provided at different locations along the hydraulic control line if there were a need for this. Such transceiver modules 101 might for example, be used to measure pressure, temperature or another parameter at different locations in the well under instructions received from the surface and transmit the resulting measurements back to the surface.

In alternatives two pickup modules may be located close to one another at a location towards the top of the hydraulic control line, i.e. towards the point at which it meets the well head. The outputs from these two pickup modules can then be fed into a comparator which is arranged to detect the difference between the two signals and amplify this difference. The output of this comparator can then be fed to the exterior of the well via appropriate cabling. This arrangement can have an advantage in that the amplification of the signal can be carried out within the shielded and relatively low noise environment which exists at the top of the well within the casing.

Figure 3:
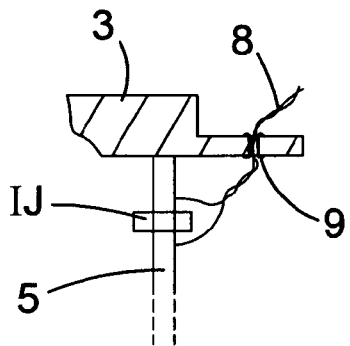
FIG. 3 shows an alternative coupling means for extracting signals from and/or applying signals to a hydraulic control line in a system similar to that shown in FIG. 1.

FIG. 3 shows an alternative coupling for use in applying signals to and extracting signals from the control line 5 in a system of the type shown in FIG. 1. Here instead of the coupling module 7 including an inductive coupling, an isolation joint IJ is provided in the control line 5 at the region where it joins the well head 3. The isolation joint IJ is shown schematically and it will be understood that such a joint serves to electrically isolate the portions of control line 5 on either side of the joint whilst allowing the control line 5 to perform its normal fluid carrying function. In this case signals may be detected across/applied across the isolation joint IJ to allow the extraction of/application of signals to the control line 5. Simple electrical connections are made to the control line 5 either side of the joint IJ and cabling 8 leads away through a penetrator 9 in the well head 3.

In some implementations the isolation joint IJ may take the form of an insulating piece or length of hydraulic hosing—this might be a commercially available component, for example a piece of hydraulic system hose as would be used in a hydraulically driven arm or bucket on a construction vehicle. In another case the hose might be high resistance rather than isolating but could still be useful and might be used in a system that functions along the lines of the coupling described below with reference to FIG. 4.

Figure 4:
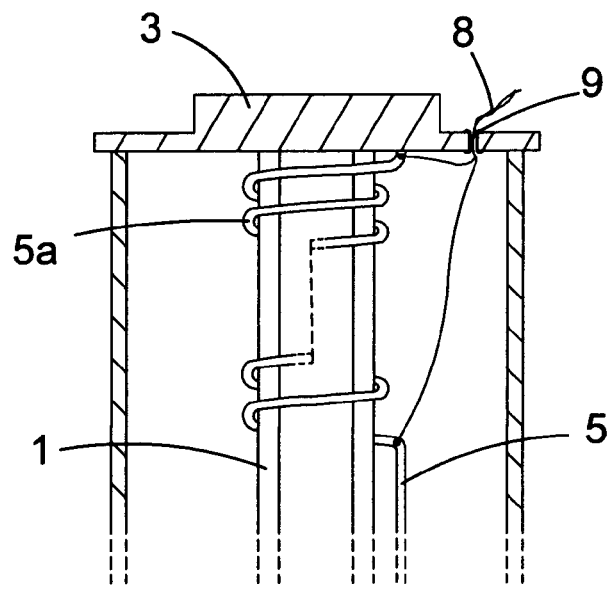
FIG. 4 shows another alternative coupling means for extracting signals from and/or applying signals to a hydraulic control line in a system similar to that shown in FIG. 1.

FIG. 4 shows another alternative coupling. Here in place of an isolation joint, additional control line tubing 5a is provided at the top of the well and wrapped around the production tubing 1. In this way a significant length of control line 5a can be provided in a small space close to the well head 3. Simple electrical connections are made to the control line 5 at either end of the coiled additional tubing 5a. Cabling 8 from these again leads away through a penetrator 9. Signals may be detected across this coiled length of control line 5a and also applied to the line 5 across this coiled length 5a. It will be seen that the coiled length of control line 5a and control line proper (down to the subsurface safety valve) 5 act as a voltage divider. Therefore, the closer the match in length between the control line proper 5 and the additional line 5a, the better this technique will function.

A component other than standard control line can be used to give this voltage divider effect provided that the other component can withstand the conditions within the well casing. As an example, a shorter length of higher resistance special control line could be used so that a smaller additional length were required. It will be seen that in theory the additional control line 5a or other component are unnecessary as one electrical connection could be made near the well head 3 and the other at a significant distance downhole (say halfway along the control line 5). In practice this is difficult, impossible or undesirable due to inaccessability and/or risk of damage. This makes the above ideas of particular utility.

In fitting an existing well with an isolation joint IJ or additional control line 5a to allow the above methods to be used, it should be possible to break the connection between the control line 5 and the well head 3, introduce the additional component and remake the connections.

In an alternative usable with each of the above techniques, the noise signal in a second well local to the well in which communication is taking place can be detected and this may be subtracted from the overall communication signal detected in the well of interest, to assist in extracting the signal of interest.

Figures 5, 6:
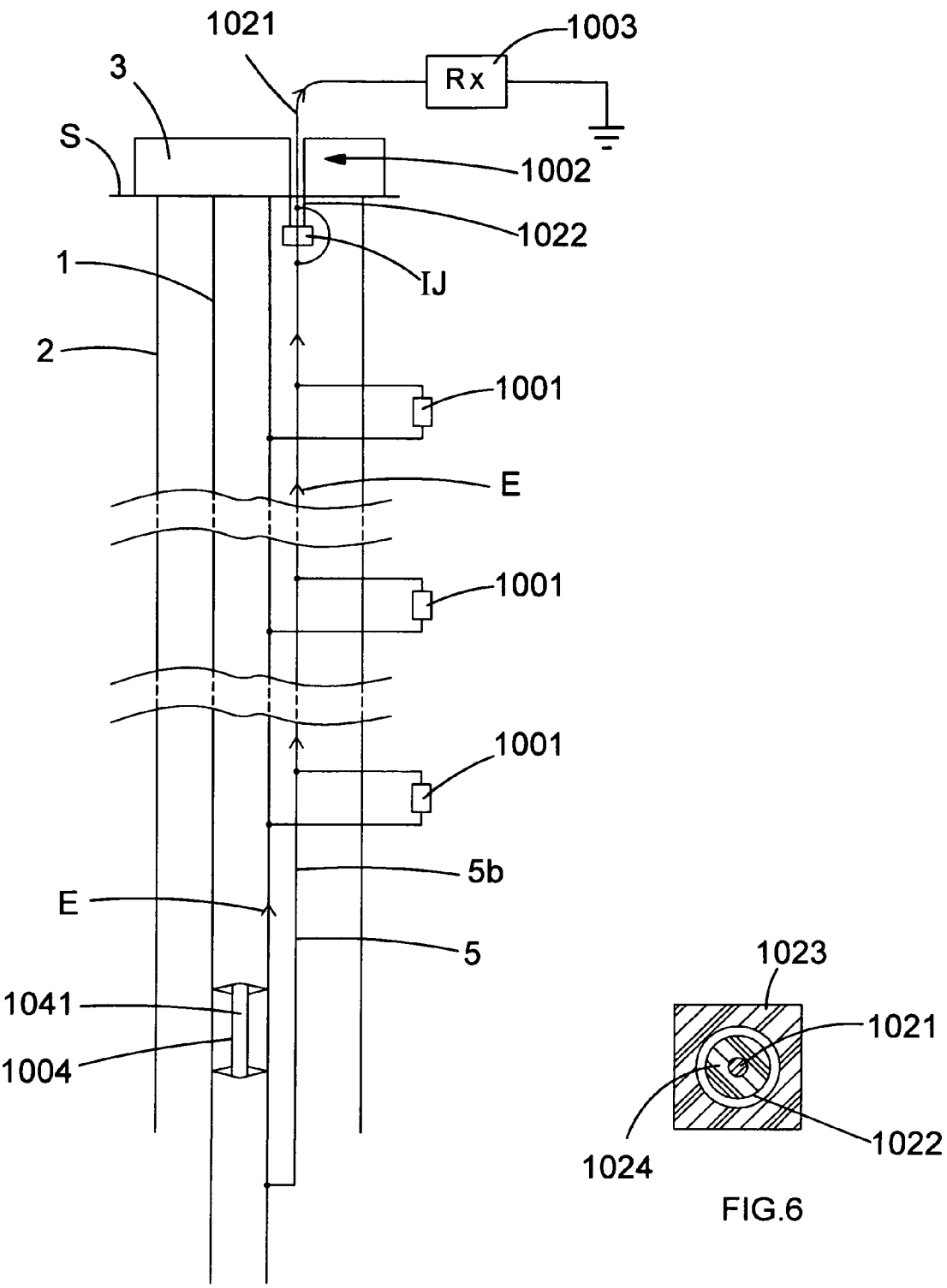
FIG. 5 shows yet another well installation including a different downhole communication system.
FIG. 6 is a schematic sectional view of a shielded insulated cable that may be used in an installation similar to that shown in FIG. 5.

FIG. 5 shows an alternative well installation comprising a downhole communication system. The well installation comprises production tubing 1 disposed within casing 2 running from a well head 3 at the surface S downhole into the well. Furthermore, a control line 5 of the type which can carry hydraulic fluid is provided within the well installation and the downhole end of this control line 5 is mechanically and electrically connected to the production tubing 1. However, in this particular instance, the control line 5 is not used as a passage for hydraulic fluid, but rather is provided within the well to provide a communication path from downhole in the well to the surface S.

In alternatives, the current downhole communication system may be used in a well installation in which the control line 5 is used primarily for carrying hydraulic fluid to downhole device, for example, a valve which is to be operated under the control of the hydraulic fluid. In such a case the control line 5 can still facilitate the data communication functions of the present control line 5.

As in accordance with standard practice, the control line 5 is covered by an insulating protective coating 5b which means that the control line 5 can provide a relatively good and clean signal channel within the well.

In the present well installation the metal of the control line 5 is electrically connected to the main downhole metallic structure of the well (in this implementation it is connected to the production tubing 1) at a plurality of locations via resistors 1001.

In FIG. 5, three resistors 1001 are shown as being connected between the metal of the control line 5 and the production tubing 1. In practical implementations there may be a differing number of connections via appropriate resistors between the metal of the control line and the production tubing 1, the number chosen being a matter of design choice. The spacing between these connection locations may typically be in the order of 1000 feet (300 metres) and the resistors may have a value in the order of say 100 Ohms to say 1000 Ohms.

In what is probably a preferably alternative, from a performance point of view, the downhole end of the control line 5 may also be connected to the main metallic structure via a resistor. This resistor preferably would have a lower resistance than the other resistors 1001 above.

It will be appreciated that FIG. 5 is far from being to scale, and rather is a schematic representation with the wavy lines across the well installation providing an indication that there is in practice a large separation between adjacent connection locations compared with the diameter of the well installation itself.

The end of the control line 5 which is closest to the well head 3 is received in an isolation joint IJ, the structure of which, in the present embodiment, will be explained in more detail below with reference to FIG. 7.

On the other side of the isolation joint IJ there is a portion of insulated shielded electrical cable 1002 having an inner conductor portion 1021 and an outer metallic shielding portion 1022. The primary purpose of the shielding portion 1022 is to provide a pressure sealed environment for the inner conductor portion of the cable. A sectional view of such a length of cable is shown in FIG. 6 which also shows the outer insulation 1023 and inner insulation 1024 between the central conductor 1021 and the outer metallic shield 1022. Again, as will be described in more detail below, the metal of the control line 5 is connected to the inner conductor 1021 of the cable 1002 within the isolation joint IJ. The inner conductor 1021 of the cable 1002 in turn is electrically connected to a surface unit 1003 which includes a receiver Rx for receiving signals detected on the control line 5.

In the present data communications system, the signals which will be present, in use, on the control line 5 originate initially from a downhole communication tool 1004 which includes a transmitter 1041 arranged to apply data carrying electrical signals to the production tubing 1 and hence the main downhole metallic structure 1, 2 of the well installation as a whole. The structure and operation of such downhole communication tools is not the subject of the present specification, but details of such tools may be found in earlier published applications of the inventor, for example, WO 01/04461. For the present purposes it is enough to appreciate that the downhole communication tool 1004 is operable to inject data carrying electrical signals E onto the production tubing 1 from where these progress up the production tubing and/or casing 2 until meeting one of the locations at which the production tubing one is electrically connected to the metal of the control line 5 via one of the transistors 1001. These connections have the effect of picking up the signal E from the main downhole metallic structure 1, 2 from where the signal may propagate along the control line 5 with less attenuation and less additive noise towards the well head 3. It will be appreciated that in practice, each of the connection locations via the respective resistors 1001 act as pick-ups for signals on the metallic structure 1, 2 although the connection location closest to the location from which the tool 1004 is transmitting is likely to be the most important.

Typically, the data to be transmitted from the downhole communication tool 1004 will include pressure and temperature information about that location in the well. The signals may be received at the surface unit 1003 by detecting the signal E in the inner conductor 1021 of the cable 1002 relative to earth as a reference.

The values of the resistors 1001 may be selected so as to be substantially equal to one another. The value of each resistor 1001 may be chosen to be significantly greater than the corresponding resistance of the control line between an adjacent pair of connection locations. In alternatives the values of each of the resistors 1001 may be chosen to be different from one another and selected such that the value of each resistor 1001 is progressively lower for each connection location downwards into the well. As mentioned above suitable values for the resistors 1001 may typically be in the order of 100 to 1000 Ohms.

It should be noted that the well head pick-up methods described above in relation to FIGS. 1, 3 and 4 can also be used in the present installation for extracting signals from the control line 5 for delivery to the surface unit 1003.

Figure 7:
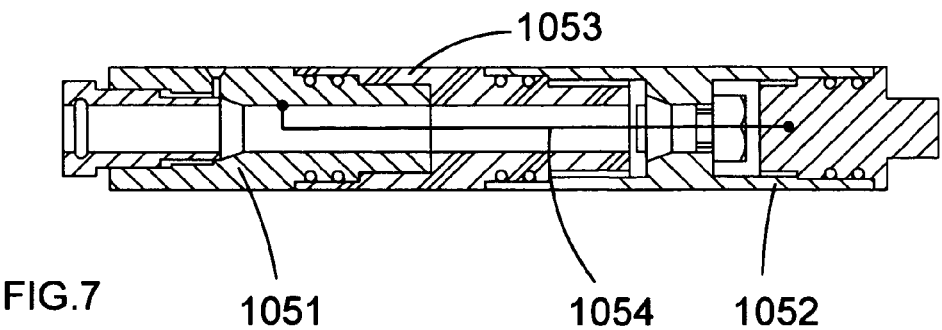
FIG. 7 is a sectional view of an isolation joint of the installation shown in FIG. 5.

Having said this, the use of an isolation joint IJ of the type shown in FIG. 7 is preferable. Referring now to FIG. 7, the isolation joint IJ between the control line 5 and the cable 1002 comprises a first conductive connection portion 1051 which is arranged to receive the control line 5 and connect electrically to the metal of the control line 5. At the other end of the isolation join IJ there is provided a second conductive connector portion 1052 which is arranged to receive the cable 1002. The outer conductive shield 1022 of the cable 1002 is electrically connected to the second connecting portion 1052 whereas the inner conductor 1021 is insulated from the second connecting portion 1052. Between the first and second conductive connecting portions 1051, 1052 there is provided an isolating portion 1053 which in the present embodiment is made from PEEK material. This means that the first conductive connector portion 1051 is electrically isolated from the second conductive connector portion 1052. However, the isolation joint IJ also includes a conductor 1054 which bridges the isolation portion 1053 and electrically connects the inner conductor 1021 of the connected cable 1002 to the metal of the first conductive connector portion 1051 and hence the connected control line 5. In this way there is an electrical connection between the metal of the control line 5 and the inner conductor 1021 of the cable 1002, whereas there is electrical isolation between the metal of the control line 5 and the outer metallic shielding 1022 of the cable 1002. This is important because as the cable 1002 passes through the well head 3 there will be intimate electrical contact between the metal of the shielding 1022 of the cable and the well head 3.

Note that if the control line 5 were to pass through the well head 3, then in a conventional installation there would also be intimate electrical contact between the metal of the control line 5 and the well head 3. Trying to avoid such intimate electrical contact between control lines 5 and outer shielding 1022 of cables passing through the well head is difficult or impractical. Therefore, the present isolation joint IJ as shown in FIG. 7 provides a very neat and convenient way for getting signals from the control line 5 out of the well without these being lost by connection to the well head 3. It will be appreciated that the shielded electrical cable 1002 used to pass through the well head 3 will typically be a TEC type of cable as is widely used within the oil and gas industry.

The isolation joint IJ shown in FIG. 7 and used in the installation shown in FIG. 5 is only usable where the control line 5 is not being used to convey hydraulic fluid to a downhole device to be operated by that hydraulic fluid.

Figure 8A:
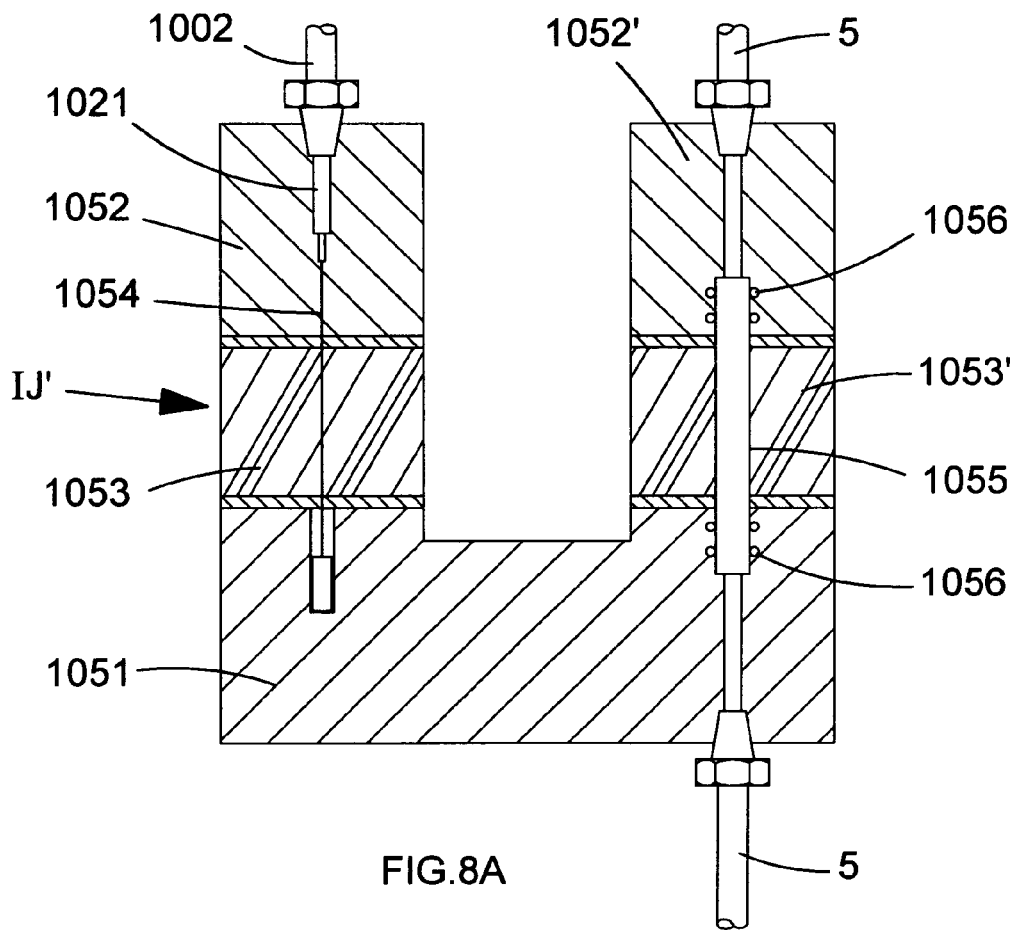
FIG. 8A is a schematic representation of an alternative isolation joint which may be used in an installation similar to that shown in FIG. 5.
Figure 8B:
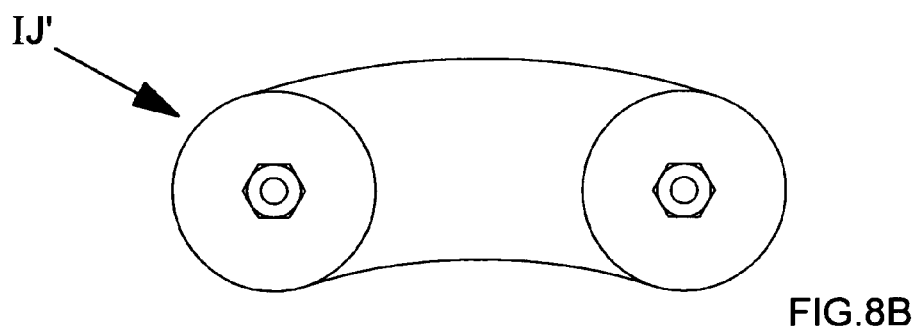
FIG. 8B is a plan view of the alternative isolation joint shown in FIG. 8A.

FIGS. 8A and 8B show a modified version of isolation joint IJ' which would be usable in an installation where the hydraulic control line 5 is to be used both for feeding hydraulic fluid to a device to be operated downhole and for electrical signalling in the way described above. In the modified form of isolation joint IJ' shown in FIGS. 8A and 8B there is again a first conductive connector portion 1051 which receives the hydraulic control line 5, but in this instance there are two second connection portions 1052 and 1052', the first of which 1052 is arranged to receive the electrical cable 1002 and the second of which 1052' is arranged to receive a further portion of hydraulic control line 5 which is to be fed onwards through the well head 3. Similarly there are two isolating portions 1053, 1053' which serve to isolate the second connection portions 1052, 1052' from the first connecting portion 1051. Again there is a conductor 1054 to electrically connect the inner conductor 1021 to the first connecting portion 1051. In this instance there is also a ceramic tube insert 1055 provided within a bore provided in the second isolating portion 1053' through which hydraulic fluid can flow between the first and second portions of control line 5. O-ring seals 1056 are provided at each end of the ceramic tube insert to provide a sealed path for the hydraulic fluid.

In both the isolation joint shown in FIG. 7 and that shown in FIGS. 8A and 8B Swagelok connectors are provided for receiving the electrical cable 1002 and control line 5 at the respective connecting portions 1051, 1052, 1052'.

Although the well installation shown in FIG. 5 has a control line 5 providing a signal channel for the extraction of data from the well, it should be noted that in alternatives a shielded electrical cable may be used to provide the signal channel in place of the control line 5. In particular, the outer metallic shielding of such a shielded cable may be used to provide the signal path. The cable would typically be of the TEC type as conventionally used in the oil and gas industry and as illustrated in cross section in FIG. 6. In such an instance, the resistors 1001 will be connected between this outer metallic shielding 1022 of the cable and the main downhole metallic structure of the well 1, 2.

Furthermore, whilst the communication system described above in relation to FIG. 5 is for the transmission of signals from a downhole location to the surface, and whilst this is by far the preferred mode of using such an installation (with spaced connections via resistors 1001 between a control line 5/cable and the main metallic structure 1, 2 of the well) it is also possible to use such a system for transmitting data from the surface down into the well and for systems where data is transmitted in both directions. The performance of such a system when transmitting data into the well, however, is relatively limited.

Figure 9:
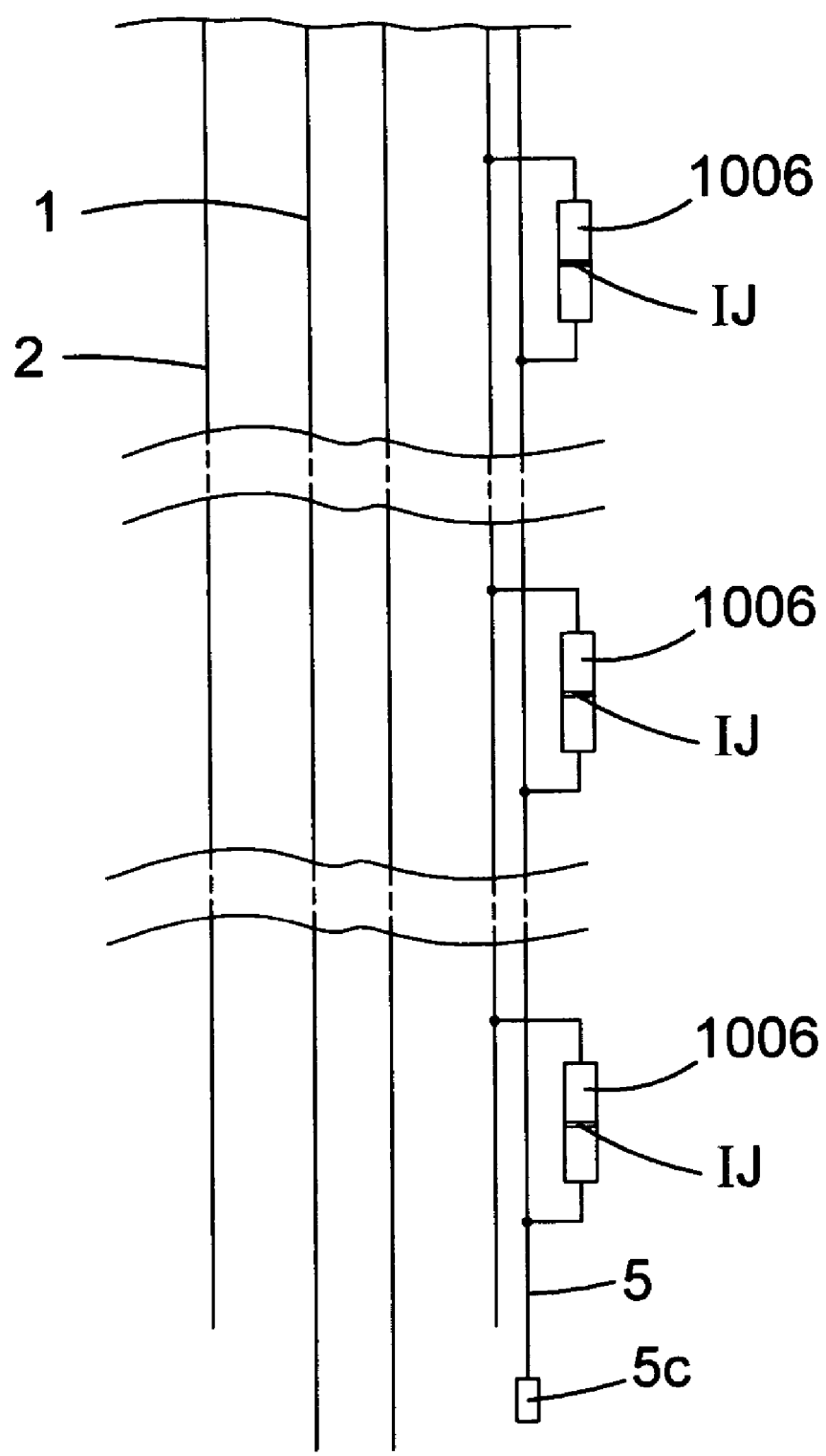
FIG. 9 schematically shows part of another alternative well installation which can operate in a similar way to that shown in FIG. 5.

FIG. 9 shows part of yet a further alternative well installation including a data communication system which is more useful in trying to achieve data communications in both directions, i.e. both from the surface to downhole and from downhole to the surface. In such a well installation the arrangement at the well head 3 may be substantially the same as that shown in FIGS. 1, 3, 4 or 5 and described in reference thereto. Therefore detail of that part of the installation is not given below. In this well installation again there is production tubing 1 provided within casing 2. However, it should be mentioned that this technique is equally applicable in wells where there is no production tubing or no casing. For the sake of completeness, it is also mentioned that this is in fact true in relation to the technique explained above in relation to FIG. 5. If there were no production tubing 1 in that instance, then connection could be made between the control line 5 and the casing 2.

Returning, however, to the installation shown in FIG. 9, here a plurality of downhole communication tools 1006 are connected between the metal of a length of control line 5 provided in the installation and the main metallic structure of the installation 1, 2. In this embodiment the downhole communication tools 1006 are connected between the control line 5 and the casing 2. In the present embodiment the control line 5 is provided externally to the casing 2 as are the downhole communication tools 106. However, in other embodiments the control line 105 and the downhole communication tools 106 may be provided within the annulus between the production tubing 1 and the casing 2.

In the present installation the downhole end of the control line 5 is terminated in a terminator 5c which ensures that the end of the control line 5 is isolated from the main metallic downhole structure 1, 2 and also provides a pressure seal at the end of the control line 5 such that the interior of the control line is not exposed to the ambient pressure at the downhole end of the control line 5.

Here the downhole communication tools 1006 are again arranged for transmitting data to the surface and furthermore can be arranged for receiving data from the surface. Data sent to the surface may for example, comprise pressure or temperature readings taken by the downhole tool and data received at the tools 1006 from the surface may comprise configuration messages for controlling the tools 1006 or control signals for controlling devices such as downhole valves and so on.

The downhole tools 1006 are arranged such that there is a high impedance path through the tool and hence in the connection between the control line 5 and the casing 2 except when the tool 1006 is transmitting. This may be achieved for example, by including an isolation joint IJ within the downhole tools, across which transmission is effected. Because there is a high impedance path through the tools 1006 when they are not transmitting and because the downhole end of the control line 5 is isolated, there is generally a high impedance path between the surface and the downhole end of the control line 5. This means that losses in signals transmitted from the surface downhole or vice versa are minimised. In effect there will be little current flow in this circumstance and differences in potential difference will be detected by the receiver at the tool 6 or surface unit 1003.

In this installation (or indeed in that described above in relation to FIG. 5 when there are multiple downhole communication tools 1004 in place) standard multiplexing techniques may be used to ensure that signals are correctly received at and/or from the different downhole tools 1004, 1006. For example, each tool 1004, 1006 may be arranged to transmit and receive at a respective unique frequency and/or may be arranged to transmit and receive at a respective unique time and/or may have a unique address.

A length of TEC type cable could be used in an installation of the type shown in FIG. 9 in place of the control line 5, but in general terms there would be little point in doing this as control line 5 would generally be the cheaper option.

An advantage of these techniques is that a readily available and trusted conductor is used as a signal channel, ie control line 5 or TEC type cable. Further, simple connections may be made to the control line/shielding at multiple locations as all that is required is stripping back some of the outer insulation and making a simple electrical connection to the metal of the control line/shielding. This is much easier and cheaper than making a connection to the inner core of a cable where pressure seal considerations must be made and more expensive components used.

In alternatives the systems described above may be used for transmitting power from the surface to a downhole location in alternative to or in addition to the transmission of data in one or more direction. In such a case the set up would be much the same as that shown above but with the surface unit 1003 including power transmission capabilities. The same signal channel would be used and in such a case can be considered as a power signal channel.

In yet further alternatives an impedance modulation signalling system may be used in transmitting data from the downhole location to the surface. In such an arrangement signalling from the downhole location may be achieved by applying a reference signal to the signal channel at the well head, monitoring the effect of this signal at the well head, for example monitoring the potential difference across a resistor, and modulating, at a downhole location, the impedance of the overall ground return signal path seen by the reference signal to encode data. The changes in the monitored quantity at the surface will be indicative of the modulation applied downhole so that the encoded data can be extracted. An example of such a technique is given in the inventor's earlier application WO99/37044. The impedance may, for example, be modulated by opening and closing a switch and/or switching impedance elements into and out of the signal path.

The invention claimed is:

1. A method of downhole communication in a well having metallic structure which includes an insulated metallic, fluid carrying, control line, the method comprising the steps of applying electrical signals to the control line at a first location and extracting the electrical signals from the control line at a second location, wherein the signal is extracted from the control line using a voltage divider technique, and the potential difference across a conductor connected in series with a main part of the control line passing towards the transmitting location is detected.

2. A method according to claim 1 wherein a respective portion towards each end of the control line is electrically and mechanically connected to other portions of metallic structure in the well so that a conducting loop exists of which the control line is a part.

3. A method according to claim 1 wherein the conductor connected in series comprises a portion of the control line itself.

4. A method according to claim 1 wherein the conductor connected in series comprises an additional piece of control line provided in the well, which additional control line is wound around the production tubing within the casing with one end of this additional line connected to the well head and the other end connected to the control line extending down into the well.

5. A method according to claim 1 wherein one end of the control line is electrically isolated from the surrounding structure.

6. A method according to claim 5 wherein isolation is provided which allows the control line to pass through the well head without electrical contact being made to the well head.

7. A method according to claim 1 wherein cabling is provided, which cabling passes through the wellhead via a penetrator arranged to provide a pressure tight seal.

8. A method according to claim 7 wherein an amplifier, for amplifying the extracted signals, is provided locally at a point where the signals are extracted from the control line.

9. A method of downhole communication in a well having metallic structure which includes an insulated metallic, fluid carrying, control line, the method comprising the steps of applying electrical signals to the control line at a first location and extracting the electrical signals from the control line at a second location, wherein there is a second well in the same region as the well in which signals are being transmitted, the method comprising the step of detecting signals due to noise seen in the second well and subtracting these from the signal extracted from the control line in the well in which signals are being transmitted.

10. A method according to claim 9 wherein signals are extracted from the control line by the steps of detecting the signals flowing in the control line at two spaced locations, subtracting the signals seen at a first of the locations from the signals seen at the other location and using the result of this subtraction as the output signal.

11. A downhole communication system for use in a well having metallic structure which includes an insulated metallic, fluid carrying, control line wherein the system comprises means for applying electrical signals to the control line at a first location and means for extracting the electrical signals from the control line at a second location and the control line acts as a signal channel, wherein the signal is extracted from the control line using a voltage divider technique, and the potential difference across a conductor connected in series with a main part of the control line passing towards the transmitting location is detected.

12. A system according to claim 11 wherein a respective portion towards each end of the control line is electrically and mechanically connected to other portions of metallic structure in the well so that a conducting loop exists of which the control line is a part.

13. A system according to claim 11 wherein one end of the control line is electrically isolated from the surrounding structure.

14. A system according to claim 13 wherein isolation is provided which allows the control line to pass through the well head without electrical contact being made to the well head.

15. A system according to claim 11 wherein the conductor connected in series comprises a portion of the control line itself.

16. A system according to claim 11 wherein the conductor connected in series comprises an additional piece of control line provided in the well which additional control line is wound around the production tubing within the casing with one end of this additional line connected to the well head and the other end connected to the control line extending down into the well.

17. A system according to claim 11 comprising cabling, which cabling passes through the wellhead via a penetrator arranged to provide a pressure tight seal.

18. A system according to claim 17 wherein an amplifier, for amplifying the extracted signals, is provided locally at a point where the signals are extracted from the control line.

19. A well installation comprising a data receiving system for receiving data from a downhole location, the well installation comprising main metallic downhole structure including at least one of metallic tubing and metallic casing and also comprising a signal channel including at least one of metal of an insulated metallic control line and metal of an outer metallic shielding of an electrical cable with an insulated outer metallic shielding, wherein the data receiving system comprises a receiver connected to the signal channel, and the signal channel is connected to the main metallic downhole structure at a plurality of spaced locations away from a head of the well via respective impedance elements, wherein the signal channel is part of a signal path including an earth return, the well installation further comprising a surface unit including the receiver and being arranged to apply a reference signal to the signal channel and to monitor changes in the reference signal seen at the surface, and a downhole data transmitting tool arranged to modulate the impedance of the signal path at the downhole location so encoding data onto the reference signal, the surface unit receiver being arranged to extract the data by monitoring resulting changes in the reference signal.

20. A well installation according to claim 19 further comprising a downhole data transmitting tool for applying data carrying electrical signals onto the main metallic downhole structure.

21. A well installation according to claim 20 in which the data transmitting tool comprises a gauge for measuring a parameter.

22. A well installation according to claim 19 in which each impedance element comprises a resistor having a first terminal which is connected to the main metallic downhole structure and a second terminal which is connected to the signal channel.

23. A well installation according to claim 22 in which the resistance values of each of the resistors are substantially the same as one another.

24. A well installation according to claim 22 in which the resistance value of each resistor is chosen to be significantly greater than the resistance of the signal channel between an adjacent pair of the spaced connection locations.

25. A well installation according to claim 22 in which the resistance values of the resistors are chosen so as to be different from one another with the values being chosen so that they are progressively lower in value the further into the well installation that the respective resistor is located.

26. A well installation according to claim 25 in which the values are chosen such that the pick up sensitivity at each connection location is substantially the same.

27. A well installation according to claim 19 in which there are at least three spaced locations at which there is a connection between the main metallic downhole structure and the signal channel and the spaced locations are arranged such that there is an equal spacing between each adjacent pair of locations.

28. A well installation according to claim 19 in which a downhole end of the at least one of the metal of the control line and the metal of the metallic shielding of the electrical cable is electrically isolated from the main metallic downhole structure.

29. A well installation according to claim 19 in which the signal channel is electrically isolated from a head of the well.

30. A well installation according to claim 29 in which the signal channel comprises control line and the well installation comprises an isolation joint for electrically isolating the control line from the wellhead.

31. A well installation according to claim 30 in which the isolation joint is for coupling the insulated metallic control line to a portion of electrical cable which has an inner conductor and an insulated outer metallic shielding, the isolation joint comprising a first conducting portion for receiving and electrically connecting to metal of the portion of insulated metallic control line, a second conducting portion for receiving the portion of electrical cable, and between the first and second conducting portions an electrically isolating portion that electrically isolates the first and second portions from one another, the isolation joint further comprising a conductor which is insulated from the second conducting portion, bridges the isolating portion, and electrically connects the inner conductor of the portion of electrical cable to the first conducting portion.

32. A well installation according to claim 31 in which the isolation joint is arranged for receiving a second portion of insulated metallic control line providing a flow path for hydraulic fluid through the isolation joint from the first to the second portions of control line, whilst electrically isolating the first portion of control line from the second portion of control line.

33. A well installation comprising main metallic downhole structure including at least one of metallic tubing and metallic casing, a signal channel including at least one of metal of an insulated metallic control line and metal of an outer metallic shielding of an electrical cable with an insulated outer metallic shielding, a surface communication unit for at least one of receiving data from and transmitting data to a downhole location via electrical signals along the signal channel, and a plurality of downhole units for at least one of receiving data from and transmitting data to the surface communication unit via electrical signals, the downhole units being spaced from one another and each downhole unit having a first terminal electrically connected to the main metallic downhole structure at a respective location and a second terminal electrically connected to the signal channel at a respective location, wherein each downhole unit is arranged so that there is a high impedance through the downhole unit and hence in the connection between the main metallic downhold structure at the respective location and the signal channel at the respective location except if the downhole unit is transmitting.

34. A well installation according to claim 33 in which the signal channel is disposed outside of the casing and each downhole unit is disposed outside of the casing.

35. A well installation according to claim 34 in which a downhole end of the metal of the at least one of the control line and metallic shielding of the electrical cable is electrically isolated from the main metallic downhole structure.

36. A well installation according to claim 33 in which the signal channel comprises control line, a downhole end of the control line is electrically isolated from the main metallic downhole structure, and the downhole end is terminated using a pressure proof terminator that seals the end of the control line.

37. A downhole isolation joint for mechanically coupling a first portion of insulated metallic control line to a second portion of insulated metallic control line and to a portion of electrical cable which has an inner conductor and an insulated outer metallic shielding, the isolation joint comprising a first conducting portion for receiving and electrically connecting to metal of the first portion of insulated metallic control line, a second conducting portion for receiving the portion of electrical cable, and between the first and second conducting portions an electrically isolating portion that electrically isolates the first and second conducting portions from one another, the isolation joint further comprising a conductor which is insulated from the second conducting portion, bridges the isolating portion, and electrically connects the inner conductor of said portion of electrical cable to the first conducting portion, wherein the downhole isolation joint comprises a connection portion for receiving the second portion of insulated metallic control line and provides a flow path for hydraulic fluid through the isolation joint from the first to the second portions of control line, and wherein the connection portion is electrically isolated from the first conducting portion for electrically isolating the first portion of control line from the second portion of control line.

38. A well installation comprising main metallic downhole structure including at least one of metallic tubing and metallic casing, a signal channel including at least one of metal of an insulated metallic control line and metal of an outer metallic shielding of an electrical cable with an insulated outer metallic shielding, a surface communication unit for at least one of receiving data from and transmitting data to a downhole location via electrical signals along the signal channel, and a plurality of downhole units for at least one of receiving data from and transmitting data to the surface communication unit, the downhole units being spaced from one another and each downhole unit having a first terminal electrically connected to the main metallic downhole structure at a respective location and a second terminal electrically connected to the signal channel at a respective location, the surface unit further comprising a power transmitter for transmitting power to the downhole units along the signal channel, wherein each downhole unit is arranged so that there is a high impedance through the downhole unit and hence in the connection between the main metallic downhold structure at the respective location and the signal channel at the respective location except if the downhole unit is transmitting.

* * * * *